United States Patent [19]

Lopez

[11] Patent Number: 4,594,084
[45] Date of Patent: Jun. 10, 1986

[54] AIR CONDITIONING SYSTEM

[75] Inventor: Wallace Lopez, Albuquerque, N. Mex.

[73] Assignee: Astrl Corporation, Albuquerque, N. Mex.

[21] Appl. No.: 754,913

[22] Filed: Jul. 15, 1985

[51] Int. Cl.$^4$ .............................................. F25B 9/02
[52] U.S. Cl. ............................................................. 62/5
[58] Field of Search ................................................. 62/5

[56]  References Cited

U.S. PATENT DOCUMENTS

| | | | |
|---|---|---|---|
| 1,952,281 | 3/1934 | Ranque | 62/5 |
| 2,920,457 | 1/1960 | Bartlett, Jr. | 62/5 |
| 3,090,208 | 5/1963 | Munakata | 62/5 |
| 3,197,969 | 8/1965 | Over | 62/5 |
| 3,361,336 | 1/1968 | Foa | 62/5 |
| 3,922,871 | 12/1975 | Bolesta | 62/5 |
| 3,982,378 | 9/1976 | Sohre | 62/5 |
| 4,051,689 | 10/1977 | MacDonald | 62/5 |
| 4,107,936 | 8/1978 | Felder | 62/5 |
| 4,240,261 | 12/1980 | Inglis | 62/5 |
| 4,302,949 | 12/1981 | Longhetto | 62/5 |
| 4,397,154 | 8/1983 | Bowers, Jr. | 62/5 |

Primary Examiner—Ronald C. Capossela
Attorney, Agent, or Firm—Paul J. Cook

[57]  ABSTRACT

The present invention comprises an axial flow compressor and an impeller in fluid communication on a common rotatable shaft with an inlet fan and drive pulley. The compressor and impeller are each dischargeable into a cooling-heating tube. An air separation device at the downstream end of the cooling-heating tube draws cool air from the axially central part of the cooling-heating tube, and it draws hot air from adjacent the inner walls of the cooling-heating tube. The different streams of air may be selectively conducted to the interior of an automobile to function as an air conditioner, a defroster or the like. The compressor, impeller and inlet fan may be empowered by rotative means such as an automobile engine.

6 Claims, 6 Drawing Figures

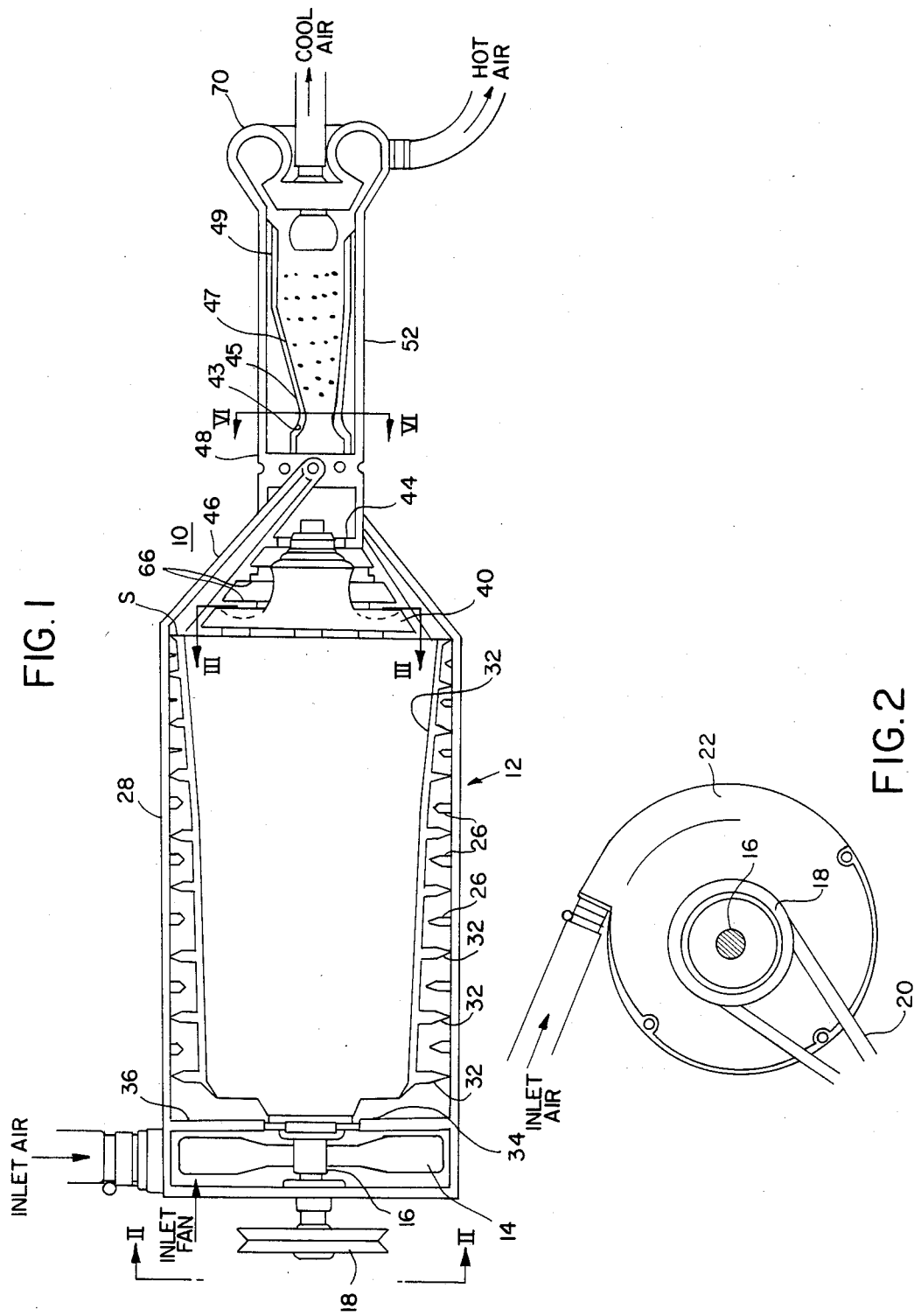

AIR CONDITIONING SYSTEM

BACKGROUND OF THE INVENTION

1. Field of the Invention

The present invention relates to air conditioning systems, and more particularly to a compressor assisted cooling-heating tube arrangement for generating a coaxial flow of hot gas and cool gas and segregating the hot gas from the cool gas for particular use thereof.

2. Prior Art

Air conditioning systems, particularly those used in automobiles, use an expensive, heavy, horsepower consuming mechanism to cool the interiors of these automobiles. Those systems weigh on the order of 100 to 150 pounds. They require about 9 to 15 horsepower to run and, they provide only cool air, not hot air. The current air conditioning systems use a vapor compression, a condenser unit, several expansion valves or capillary tubes, an evaporator, and a number of high pressure hoses. The pressure in the current systems often exceed 300 pounds per square inch and are prone to leakage due to work seals or deteriorated hoses.

Arrangements, other than vapor compression-refrigeration cycles, have been devised, to provide warm or cool air on demand. One such arrangement is shown in U.S. Pat. No. 1,952,281 to Ranque, wherein a fluid under pressure is admitted in a vortex fashion into a tubular member, the fluid, preferably a gas such as air, forming two coaxial sheets each having a gyratory motion, and reacting upon one another so as to produce, under the action of centrifugal force, the compression of the outer sheet by the inner sheet which expands, this compression absorbing a certain amount of work, which is evidenced by a rise in temperature of the compressed (outer) sheet of fluid at the expense of the inner sheet of fluid, which is cooled. Ranque devised a rotor to provide initial compression which supplied the fluid to stationary blades which were mounted on an annular body, and which created the vortex. This only provides limited amounts of air and is inefficient due primarily to boundary layer dissipations and the associated stresses between streamlines of gas molecules at their resepctive radial positions and velocities within the tubular member. In traversing the distance of the vortex tube, great loss in energy occurs due to boundary layer drag which performs an irreversible amount of work on the flowing gas molecules and causes the inner stream of gas molecules to perform work on one another via an attempt at momentum conversion.

Another vortex tube cooling arrangement is seen in U.S. Pat. No. 2,920,457 to Bartlette, wherein motor driven centrifugal compressor is connected through a conduit, to an inlet of a vortex tube. The vortex tube has a finned hot end, and a cool end which is connected to an evaporator, which returns the fluid via a conduit, to the compressor unit. A pump or fan is shown for moving air across the evaporator. This unit is inefficient and bulky, and would not provide both the hot and cold air as readily as the present invention.

U.S. Pat. No. 4,240,261 to Inglis shows a vortex tube air conditioning device having control means thereon for adjusting the temperature of the outlet air from the unit. This device is useful in personal size applications however, such as welder's helmets or the like. The design is not capable of producing quantities of air which would be useful for cooling something on the order of an automobile.

A vortex tube, shown in U.S. Pat. No. 3,486,643, is designed to provide hot or cold air for automobiles, but only to heat or cool specific small items such as an automatic choke or an engine, not the whole interior of a car.

A refrigeration and heating system for automobiles is shown in U.S. Pat. No. 4,302,949, which utilizes a vortex tube for dividing a gaseous fluid into a hot stream and a cold stream. Unfortunately, the device uses a number of pumps, pressurized heat exchangers, coils and regulating valves, which assembly approaches the complexity of current vapor compression refrigeration cycle devices presently used in the automotive field today.

It is an object of this invention to provide a gas treating system wherein kinetic energy is imparted to a gas stream and a cool gas product stream and a hot gas product stream are produced.

It is a further object of the present invention to provide an air conditioning system, particularly for automobiles or the like, costing only a fraction of presently available air conditioning units.

It is a further object of the present invention to provide an air conditioning system capable of providing heat immediately, instead of having to wait for a prime mover to be energized, thus providing defrosting and warming capabilities upon demand.

It is yet a further object of the present invention to provide an air conditioning system which weighs only a fraction of present systems and uses only a fraction of the horsepower required on present day air conditioning systems used in automobiles today.

BRIEF SUMMARY OF THE INVENTION

The present invention comprises a gas treating apparatus or system for producing a cool product gas stream and a hot product gas stream from an incoming gas stream to which kinetic energy has been imparted. The gas treating apparatus is particularly useful as an air conditioning apparatus for an automobile or the like, which is capable of providing hot or cold air, or a mix thereof, upon demand. In an automobile, the system comprises an axial flow compressor unit which is mountable adjacent an automobile engine. The compressor can be of any conventional design and typically has an inlet fan at its front end thereof. The inlet fan spins on an axis that is common with a pulley on the distal end of its axis. The pulley may have a V-belt therearound which is engageable with a pulley on the crank shaft of the engine, to supply rotary power to the compressor unit.

The inlet fan is disposed in a scroll housing, having an inlet passageway disposed therethrough to permit air to enter the fan area and be directed axially rearwardly into the compressor. An arrangement of 9 rows, usually between about 6 and 12 rows of rotatable blades and a corresponding number of rows of statioanry blades comprises the multi-stage compressor, the rotatable blades being disposed on a rotatable drum, which shares its axis of rotation with the fan and the pulley. A thrust bearing supports the axis of the drum in a forward wall of the compressor housing.

An impeller is mounted on the down stream end of the impeller axis in a frame portion within the downstream end of the housing. The downstream side of the compressor unit is in fluid communication with a plurality of channels which are disposed in a cone shaped orientation, the downstream end of those channels comprising nozzles which tangentially direct the pressurized air into the upstream end of a converging-diverging tube designed to produce a cool gas product stream and a hot gas product stream. The converging-diverging tube is of cylindrical configuration, and has an upstream end which is in fluid communication with the above-mentioned downstream end of the housing, receiving an axial flow of air from the impeller.

The converging-diverging tube design and the inlet nozzles associated therewith either alone or in combination with apparatus utilized upstream thereof to deliver pressurized gas to the converging-diverging tube constitute the novel features of this invention. The nozzles have an optimal subsonic design and are spaced apart evenly about the inlet to the converging-diverging tube. From the tube inlet, the converging-diverging tube includes a converging section, a short straight section, a diverging section and a long straight section. At the end of the tube opposite the tube inlet is positioned means for separating hot gas segregated at the radially outermost portion of the straight section of the tube from cool gas segregated at the radially innermost portion of the straight section of the tube. Small gas inlets along a portion of the tube are provided to inject a cushion of gas along the tube walls, thereby to segregate the moving gas within the tube from the tube walls.

BRIEF DESCRIPTION OF THE DRAWINGS

The objects and advantages of the present invention will become more apparent when viewed in conjunction with the following drawings, in which:

FIG. 1 is a cross-sectional view of an air conditioning system constructed according to the principles of the present invention;

FIG. 2 is a view taken along the lines II—II of FIG. 1;

DESCRIPTION OF THE PREFERRED EMBODIMENT

Figure 4:
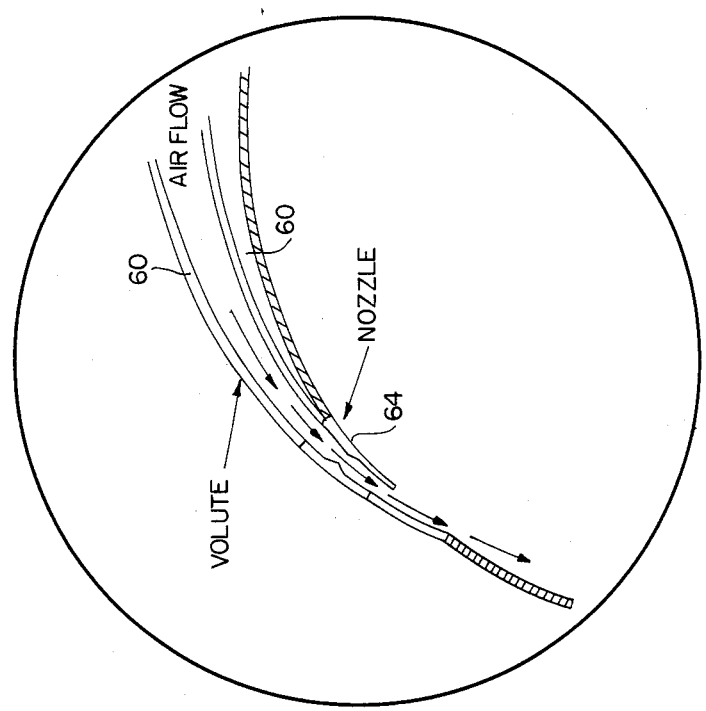
FIG. 4 is an enlarged view of a portion of FIG. 3.

Referring now to the drawings in detail, and particularly to FIG. 1, there is shown an air conditioning system 10 for an automobile or the like, which is capable of providing either hot or cold air, or a mix thereof, upon demand. The air conditioning system 10 comprises an axle flow compressor unit 12, which may be mountable adjacent an automobile engine, not shown. The compressor unit 12 has an inlet fan 14 at its front upstream end thereof. The inlet fan 14 spins on an axle 16 that it shares with a pulley 18 mounted thereforward. The pulley 18 may have a V-belt 10 or the like, therearound, as shown in FIG. 2, which belt may be engageable with drive means such as a pulley on the end of a crank shaft of an automobile engine, not shown, to provide the rotary power to the compressor unit 12.

The inlet fan 14 is rotatively disposed in a scroll housing 22, having an air inlet passageway 24 therethrough to permit air to enter the fan area and be directed rearwardly or downstream, into the compressor unit 12. An arrangement of a plurality of rows of stationary blades 26 are annularly disposed on the inner surface of a housing 28, which encloses a rotatable drum 30, on which a corresponding number of rotatable blades 32 are secured. The drum 30 shares its axis of rotation 16 with the fan 14 and pulley 18. A thrust bearing 34 supports the axis 16 of the drum 30 in a forward wall 36 of the housing 28.

An impeller 40 is mounted on the down stream end of the axis 16 of the compressor unit 12. A second thrust bearing 42 supports the downstream end of the axis 16 supported in a frame portion 44 within the downstream end of the compressor housing 28. The downstream side of the compressor unit 12 is in fluid communication with a plurality of channels 46, which extend from the fluid stage "S" of the compressor unit 12, to a nozzle ring 48, having a plurality of nozzles 50 therein as shown in FIG. 1. The channels 46 are arranged in a conical configuration, and conduct a portion of the air from the final compressor stage "S" one channel 46 for each nozzle 50, to each nozzle 50. Each nozzle 50 is disposed so as to direct fluid (air) in a tangential manner into a cylindrically shaped converging-diverging shaped tube 52. Each nozzle 50 is also directed rearwardly so as to give the fluid a gyrating or rectilinear flow path, particularly adjacent the inner wall of the converging-diverging tube.

The interior design of the converging-diverging tube 52 shown generally in FIG. 1 will be discussed in detail below with reference to FIG. 6. The tube 28 includes a converging section 43, a short straight section 45, a diverging section 47 and a long straight section 49.

Figure 3:
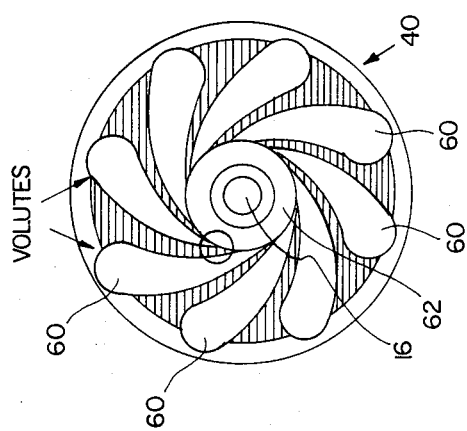
FIG. 3 is a view taken along the lines III—III of FIG. 1.

The converging-diverging tube 52 has an upstream end which is in fluid communication with the downstream end of the compressor housing 28, which also comprises the outer housing for the impeller 40. The impeller 40, being arranged on the axis 16 common with the drum 32 and the fan 14, therefore rotates in the same direction. The impeller 40 comprises a plurality of volutes 60, which are disposed, equally spaced, about a hub 62, as shown in FIGS. 1 and 3.

The radially inner ends of the volutes 60 are arranged so as to define small conventional optimal subsonic design Delaval type nozzles 64, as shown in FIG. 4, for example, and described in "Gas Dynamics", James E. A. John, Published by Allyn and Bacon, 9th Printing, June 1978. The nozzles 64 between adjacent volutes 60 accelerate the air which is drawn thereto from openings between peripherally adjacent channels 46, and direct that accelerated air (at speeds of up to about Mach 0.99 and, for example, an air flow volume of about 100 to 300, axially downstream, past radially inwardly directed vanes 66 and centrally downstream, through the nozzle ring 48 toward the downstream end of the converging-diverging tube 52.

Figure 5:
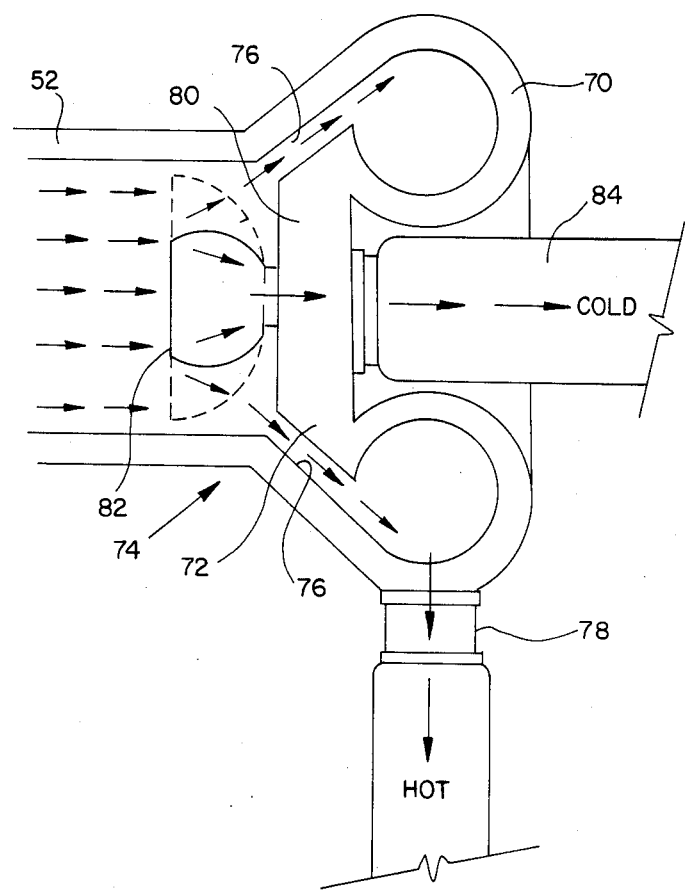
FIG. 5 is an enlarged view of the downstream end of the system.

The means for separating the hot gas product stream from the cool gas product stream located downstream end of the converging-diverging tube 52, as shown in FIG. 5, comprises an annular housing 70, which has an inner lip 72 that defines a gas separator section 74. An annular gap 76 is disposed between the inner lip 72 and the inner wall of the downstream end of the converging-diverging tube 52. The annular gap 76 provides a flowpath for fluid (air) travelling downstream in the converging-diverging tube 52 near the inner walls thereof. The annular housing 70 has an outlet channel 78 disposed therethrough to duct that fluid towards an outlet, not shown, at the end thereof. A frame 80 is disposed across the circular periphery defined by the inner lip 72. A cowling 82, which may be of enlargeable diameter, to permit varying fluid flow to be captured thereby, is in fluid communication with a central outlet channel 84, which cowling 82 captures and ducts air from the central axial portion of the converging-diverging tube 52, thereout, towards an outlet.

The central axially directed air in a converging-diverging tube 52 is cold and the air adjacent the inner walls of the converging-diverging tube 52 is hot. The outwardly directed channel 78 comprises means for channeling hot air from the tube 52, the central channel 84 comprising means for channeling cold air from the tube 52, towards the interior of an automobile or inside of a frosted window or the like.

Figure 6:
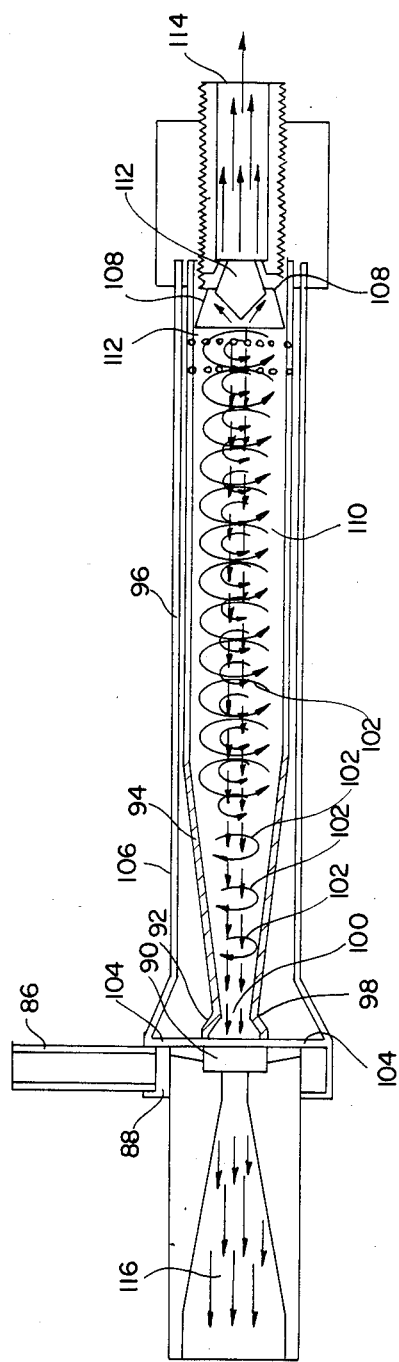
FIG. 6 is a longitudinal cross-sectional view of a converging-diverging tube having an alternative means for segregating the hot gas product stream from the cold gas product stream.

Referring to FIG. 6, air enters through the inlet connection 86 and then flows into the inlet air chamber 88, which houses the primary nozzles 64 (see FIGS. 3 and 4). The primary nozzles 64 are optimally designed so as to convert the potential energy in the form of pressurized gas into the highest state of kinetic energy in the form of moving gas particles. When the nozzles 64 are of supersonic design, they are capable of providing very high exit velocities; however, these nozzles inherently are sensitive for off design conditions such as pressure changes at the nozzle exits, etc. Therefore, nozzles of slightly subsonic design (above Mach 0.9, preferably above Mach 0.95) are utilized in the device of the present invention. The design of these nozzles follows conventional design practices for high efficiency Delaval nozzles. The number of nozzles utilized depends upon the overall flow rate and efficiency desired, except where the number of nozzles is so numerous that the overall efficiency of the combined nozzles is reduced to the associated and proportionate boundary layers of each nozzle. The exiting gas molecules are released into a primary swirl chamber 90 where the exits of the nozzles are tangent to the outer wall diameter of the swirl chamber 90, which surrounds and is segregated from cool gas product outlet 92 of the exiting gas molecules into that of a rotating uniform flow. The gas molecules now encounter a section of converging diameter termed the primary transition zone 92. This converging of the tube wall increases the angular (and instantaneous) velocities of the gas molecules due to a conservation of momentum where the divergence 94 of the tube walls performs work on the flow. This same divergence in the walls of the tube in accelerating the gas molecules to a higher (kinetic) energy state performs the same end effect that supersonic nozzles would provide, without the inherent sensitivity to difficult to control operating conditions. The increase in velocities of the gas molecules is inversely proportional to the reduction in the diameter (radius) or the convergence 92 of the tube. The overall reduction in tube diameter should not exceed a total of about 29% with a corresponding angle of 41° to the longitudinal axis of tube 96. This, therefore, increases the gas molecule velocities by a maximum of about 29% and the kinetic energy by an amount equal to one half the gas mass times the gas velocity squared. Having increased the gas velocities above Mach 1, the gas flow has undergone a transition from subsonic to supersonic and, thus, a primary zone of transition has occured. The diameter of the primary swirl chamber 90 is determined so that the ratio of the gas flow rate (pounds mass/minute) to gas rotational velocity, W (radians/min or revolutions/min) times the Reynolds number is less than or equal to 190. This results in the most efficient formation and continuance of circular (axial) flow.

The next section 98 of small constant diameter consists of a section of tube of constant diameter equal to that of the final diameter of the primary transition zone 92. The length of this section 98 should not exceed 10% of the diameter of the section 98. This comparitively short section 98 of the converging-diverging tube allows the gas flow to stabilize after its transition to supersonic velocity, and before it enters its next transtion. This portion of the converging-diverging tube is termed the stability chamber 100.

The axial flow of gas next encounters, a diverging 94 of the tube walls, due to the sonic transition in the primary transition zone, and although appearing contrary, the gas flow accelerates to a higher energy state (greater velocities). This derives from the equations and fundamentals of supersonic flow through enclosures, where a divergence is observed to accelerate the supersonic flow additionally. This gradual divergence of the tube wall 94 is termed herein as the secondary transition zone. The angle of divergence of wall 94 is between about 5° and 9° with the final diameter not exceeding twice the diameter of the primary swirl chamber 90.

The primary transition zone 92, stability chamber 100 and secondary transition zone 94 all have apertures 102 in the tube wall which lubricate the boundary layer, thus reducing parasitic drag. These apertures 102 are designed so as to tangentially inject gas along the wall of the tube thus adding energy and reducing the drag associated with a moving fluid over the stationary wall surface. Each nozzle aperature 102 is designed for maximum performance where the proper ratios of length and width (taper) are utilized. The number of nozzles should be a maximum so as to lubricate the main gas flow in as many positions as possible. Additionally, each nozzle 102 should be positioned so that the exiting gas molecules are tangent to the inner wall of the tube substantially identical to the primary nozzles. The total flow rate of the combined nozzles should not exceed 10% of the total flow rate from the primary nozzles and should be preferably about 5 to 7% of the total flow rate from the primary nozzles. An independent gas stream can be utilized as the lubricating gas, if desired. Gas is delivered to the boundary layer nozzles 102 via apertures 104 in the inlet gas chamber. These apertures 104 are designed to allow a flow of gas at the same pressure as enters the tube 96 to pass between the inner tube 94 and outer tube 106 to the boundary layer nozzles 102. Therefore, the quantity (flow rate) of gas required by the boundary layer nozzles 102 and a neglible pressure drop across these supply apertures, are the design criteria. The orientation of the boundary layer nozzles 102 is most effective when arranged in a spiral which matches the path of gas molecules flowing through the tube 96 from inlet 92 to outlet 108. The angle can be calculated using:

$$\theta = \tan^{-1} V/U$$

V = tangential velocity,
U = axial velocity $U = Q/A$,
Q = volumetric flow rate, A = Cross Sectional Area of the tube 96.

The configuration of the converging-diverging tube is now that of a tube of constant diameter equal to that of the final diameter of the secondary transition zone 110, with additional boundary layer nozzles lubricating a portion, e.g. about 25% of the remaining device length. The total length from the primary swirl chamber 90 to the end portion 102 of constant diameter should not exceed the ratio of the total length of the primary swirl chamber over the diameter of the primary swirl chamber greater than 20 and less than 40, preferably between about 29 and 36.

The converging-diverging tube 96 now consists of dividing the flow into variable amounts of hot and cold gas. This can be accomplished in several ways. Since the hotter molecules are at the outer radial position and the colder molecules are at the inner radial position, any arrangement which separates the two without impeding the flow will suffice.

As shown in FIG. 6, a means is provided for separating the hot and cold gas streams which differs from that shown in FIG. 5. The gas passing through tube 96 impinges upon gas separator 112 which directs hot gas at elevated pressure, forces the cool gas radially inwardly and causes the cool gas to reverse flow direction within tube 96 toward cool gas product outlet 116.

Thus, there has been shown an apparatus of simple construction which can be utilized to provide hot and/or cold gas such as hot and/or cold air to the interior of an automobile.

I claim:

1. Apparatus for converting a first gas stream having a superatmospheric pressure into a hot gas product stream and a cool gas product stream which comprises a plurality of slightly subsonic nozzles having first inlet means for introducing said first gas stream into said nozzles, said nozzles having exit means for introducing gas from said nozzles tangentially into a cylindrical tube, said cylindrical tube having a second gas inlet means and a second gas outlet means, said cylindrical tube having a first section with walls converging toward the axis of said cylindrical tube, a short stabilizing section contiguous to said first section and having walls generally parallel to the axis of said clyindrical tube, a second section contiguous to said stabilizing section and having walls diverging away from the axis of said cylindrical tube and a long stabilizing section contiguous to said second section and in fluid communication with said second gas outlet means, said long stabilizing section having walls generally parallel to the axis of said cylindrical tube, means for separating a hot gas product stream in the long stabilizing section located in a radially outer position of the long stabilizing section from a cool gas product stream located in a radially inner portion of the long stabilizing section and means for recovering said hot gas product stream separately from said cool gas product stream.

2. The apparatus of claim 1 including means for introducing a second gas stream tangentially within at least a portion of said cylindrical tube in said second section and said long stabilizing section.

3. The apparatus of claim 2 wherein the volume of the second gas stream comprises between 5 and 7% of the volume of the first gas stream.

4. The apparatus of claim 1 wherein said first gas stream is produced from a compressor.

5. The apparatus of any one of claims 1, 2 or 4 wherein the length of the short stabilizing section is less than 10% of the diameter of the short stabilizing section.

6. The apparatus of any one of claims 1, 2 or 4 wherein the angle of divergence of the walls of the second section is between about 5° and 9° with respect to the axis of said cylindrical tube.

* * * * *